United States Patent [19]
Ludvigsson

[11] 3,930,456
[45] Jan. 6, 1976

[54] SHIP'S AFTERBODY, ESPECIALLY FOR A FULL-FORM SHIP FITTED WITH MORE THAN ONE PROPELLER

[76] Inventor: Lennart Ludvigsson, Laxgatan 7, Vastra Frolunda, Sweden, 421 79

[22] Filed: Oct. 1, 1973

[21] Appl. No.: 402,013

[52] U.S. Cl............................ 114/57; 114/41
[51] Int. Cl.² ................................ B63B 1/08
[58] Field of Search .............. 114/57, 40, 41, 42

[56] References Cited
UNITED STATES PATENTS

| | | | |
|---|---|---|---|
| 2,729,182 | 1/1956 | Tommasi | 114/57 |
| 3,092,061 | 6/1963 | Costanzi | 114/57 |
| 3,416,480 | 12/1968 | Pien | 114/57 |

Primary Examiner—Trygve M. Blix
Assistant Examiner—Gregory W. O'Connor
Attorney, Agent, or Firm—Holman & Stern

[57] ABSTRACT

With ships fitted with more than one propeller, it has been found that a remarkable increase in a ratio speed/power can be obtained especially in full-form ships, if the under-water portion of the ship's afterbody, at a level corresponding to the top clearance of the propellers, is divided into an upper, full body portion and a lower, narrow body part, with the transient part between said body portions being designed to form a substantially horizontal hull surface at each hull side.

3 Claims, 3 Drawing Figures

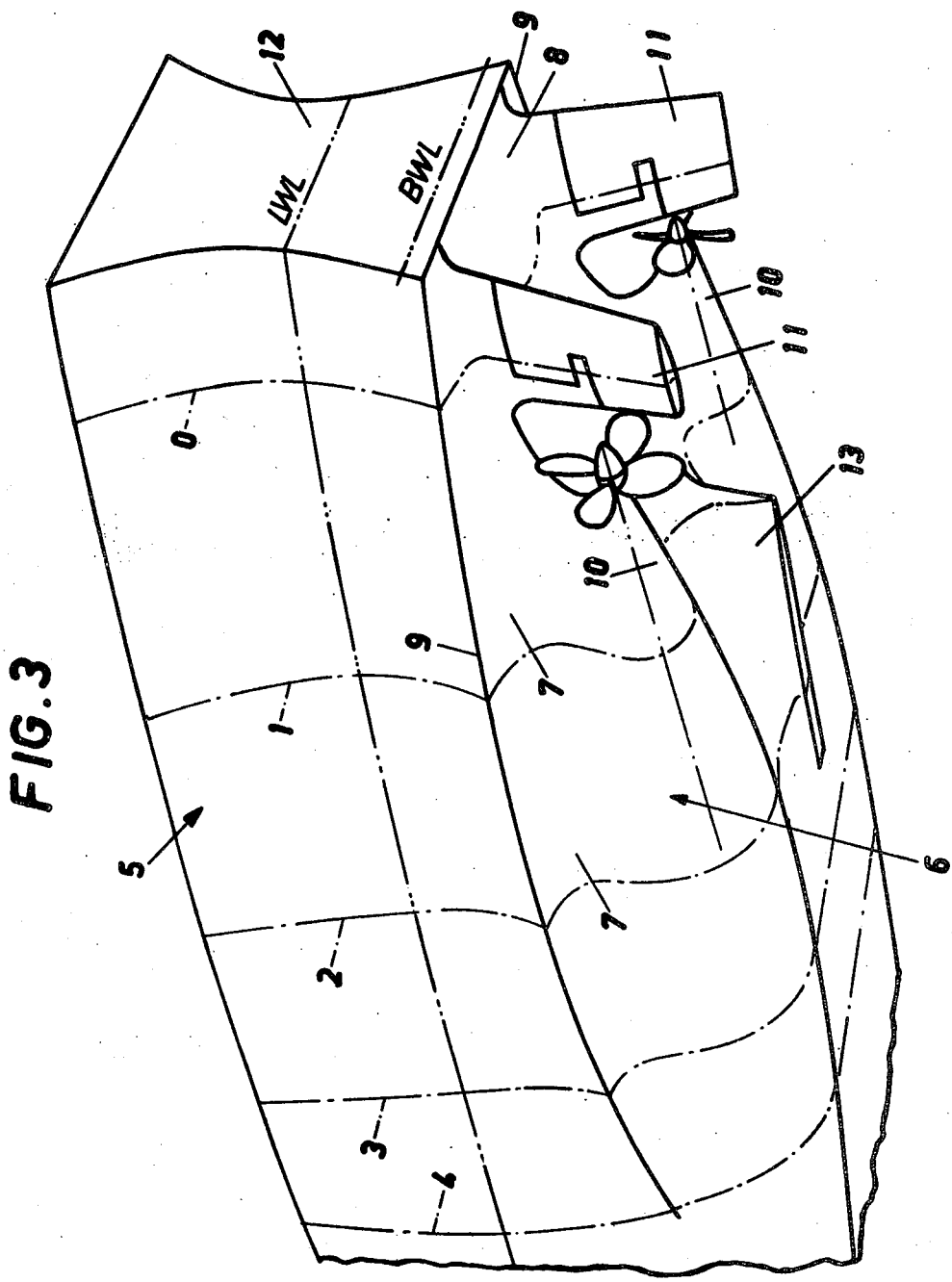

SHIP'S AFTERBODY, ESPECIALLY FOR A FULL-FORM SHIP FITTED WITH MORE THAN ONE PROPELLER

BACKGROUND OF THE INVENTION

The development during recent years towards increased size of full-form (relatively slow) ships having afterbodies of conventional design has brought forward grave problems concerning cavitation and vibrations, as well as a decreased propulsion efficiency. Very simply expressed, the difficulties will occur when the water closes in behind a large, full-bodied ship's hull and the propeller has to operate in a turbulent stream of water.

SUMMARY OF THE INVENTION

The object of the present invention is to design the afterbody in such a manner that the unfavorable flow will be moved from the propeller and rudder space to a space behind the ship. This is, according to the invention, attained by dividing the underwater part of the afterbody, at a level corresponding to the top clearance of the propellers, into an upper, full body portion and a lower, narrow body portion, with the transient part between said body portions being designed to form a substantially horizontal hull surface at each hull side.

In ferry-boats and similar vessels, the afterbody has, on occasions, been provided with a broad, flat stern, and the frames have been considerably flared to provide the largest possible deck area. This broadened portion is, however, located above, or level with the waterline and has thus no influence upon the flow of water along the underwater body.

BRIEF DESCRIPTION OF THE DRAWINGS

FIG. 3 is a perspective view of the afterbody according to FIGS. 1 and 2, as seen from below.

DESCRIPTION OF THE PREFERRED EMBODIMENT

Figure 1:
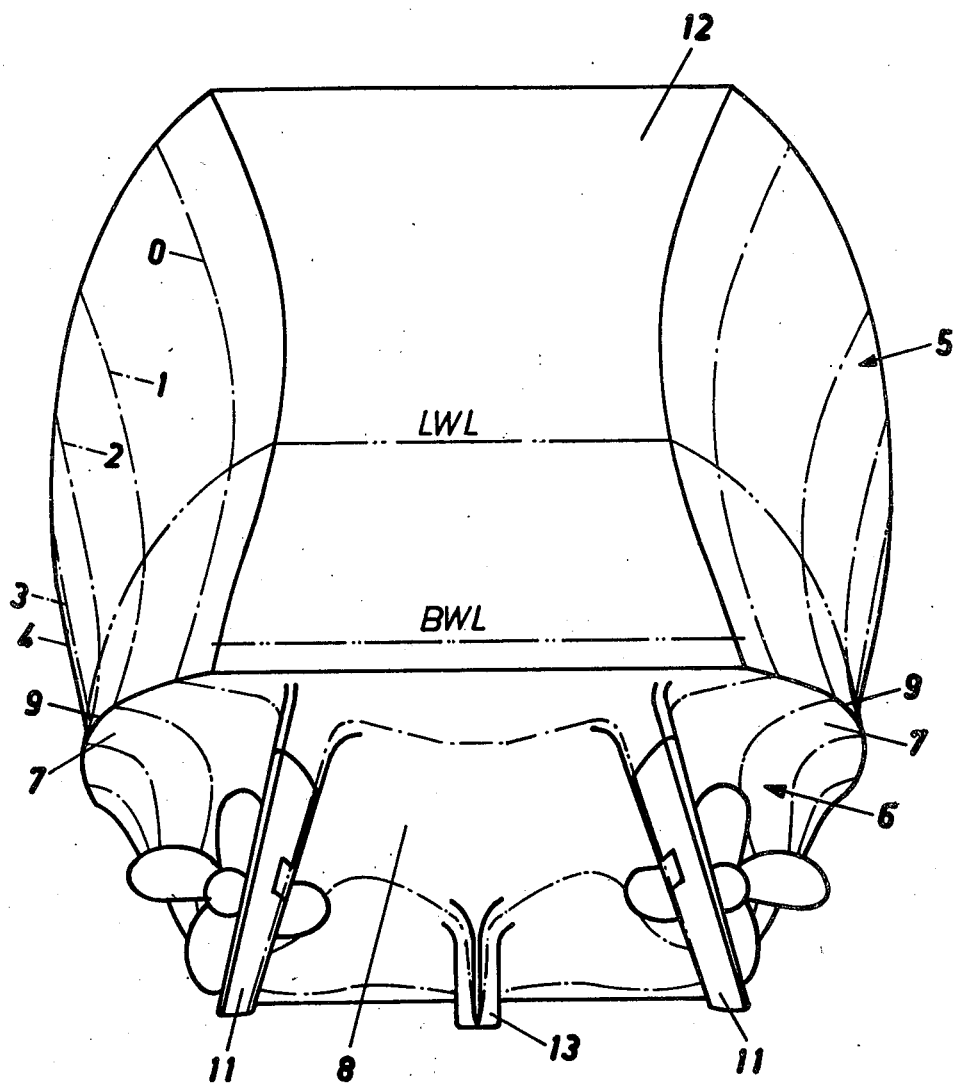
FIG. 1 is a perspective view of the afterbody of a twin screw vessel, as seen from behind.
Figure 2:
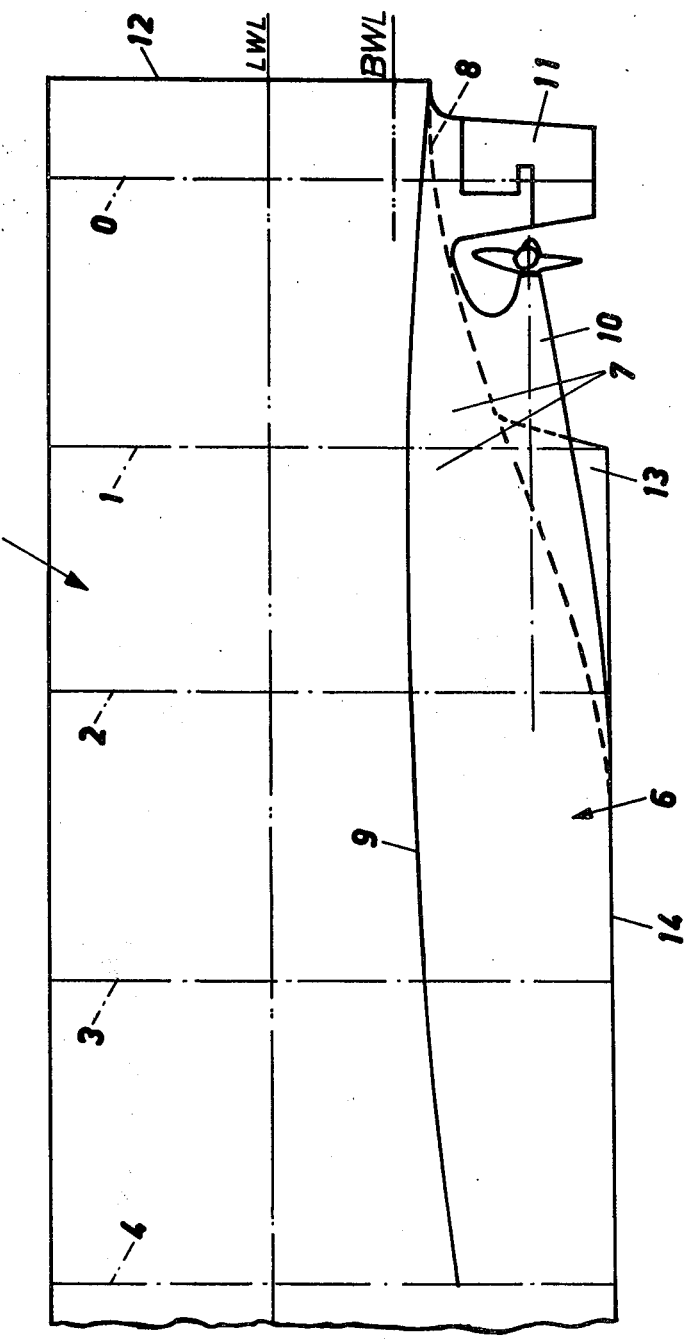
FIG. 2 is an elevation of the same afterbody.

The afterbody shown in the drawings is intended for full-form or relatively slow ships. In order better to define the shape of the afterbody, the frames have been indicated also on the perspective views. The spacing between the frames indicated by 0, 1, 2, 3, and 4 corresponds in conventional manner to one-twentieth of the length of the ship. The afterbody is, according to the invention, composed of an upper body portion 5 and a lower body portion 6. These body portions are defined by abruptly turned, inwardly directed portions 7, and a substantially horizontal roof portion 8 located intermediate the inwardly turned portions, with said portions together forming a roof above the rudder and propeller space as well as above the lower body portion 6.

The transient part between the upper and the lower body portions 5 and 6, respectively, is, in the drawings, shown as a marked edge 9. The edge 9 and the portions 7 are arranged to follow the flow line, i.e., the edge 9 mainly extends horizontally.

The inwardly turned portions 7 and the intermediate roof portion 8 form a roof above the rudder and propeller space at a distance from the propellers, corresponding to the top clearance, i.e., the free distance between the tip of an upwardly directed propeller blade and the portion of the hull located vertically thereabove.

The portions 7 of the surface, outside rudders 11, are substantially horizontal, while the portion 8 intermediate the rudders is inclined downwards in the forward direction at an acute angle to a base line 14 of the ship. If the portion 8 between propeller bosses 10 is considerably extended towards the base line 14, it may be advantageous to provide a centrally located dock keel 13.

The afterbody may be terminated by a flat stern, which may be plane, vaulted, or divided, and which may be arranged vertically or slightly inclined.

The proportions between the full, upper body portion and the lower, narrow body portion is chosen in such a manner that the excess in displacement (as compared with a hull form of a conventional ship) in the upper body portion is compensated by a corresponding decrease in displacement in the lower body portion. The volume of the lower body portion is reduced as much as possible with due consideration to the requirement for machinery space. Thus, the most advantageous waterline angles are obtained in the space forward of the propellers, which increases the propulsion efficiency.

As an example may be mentioned, that tests with a twin screw tanker model designed according to the present invention have shown that the ratio speed/power was increased by 20% as compared to tests with a model belonging to a 300,000 TDW tanker series tested by the Swedish Ship Research Foundation and the Swedish State Ship building Experimental Tank. Measurements of the wake distribution within the propeller field show fully satisfactory values, which is of considerable importance with respect to the grave cavitation and vibration problems mentioned in the introduction to the specification.

The invention is not limited to the embodiments shown and described, and a number of variations are possible within the scope of the claims. The after body may thus be provided with a peak portion differing from the flat stern shown.

What I claim is:

1. In a full form ship including a hull having sides, an after body, a middle part, and a transom stern, at least two propellers at the stern, a boss for each propeller and a rudder, a horizontal bottom portion of the middle part being inclined upwardly and extending to a level corresponding to propeller clearance providing a substantially horizontal hull surface above the rudder and propellers, the hull surface at the stern having a width greater than the distance between the bosses for the propellers, said after body having an underwater part, the underwater part being divided into an upper full body portion and a lower narrow body portion, and a transition portion between the upper full body portion and the lower narrow body portion comprising substantially horizontal hull surfaces which successively change over into the sides of the middle part.

2. The hull as claimed in claim 1 in which the upper full body portion terminates in a transom stern, said stern having a lower edge, said lower edge being located substantially at the level of the transition portion.

3. The hull as claimed in claim 2 in which the upper full body portion is provided with a lower surface located above the rudder and propeller, the lower surface extending to the lower edge of the transom stern.

* * * * *